United States Patent
Kienzler et al.

[11] Patent Number: 5,448,180
[45] Date of Patent: Sep. 5, 1995

[54] TRANSMITTER END STAGE

[75] Inventors: Rainer Kienzler, Reutlingen; Ulrich Fleischer, Pliezhausen; Berthold Elbracht, Reutlingen, all of Germany

[73] Assignee: Robert Bosch GmbH, Stuttgart, Germany

[21] Appl. No.: 119,093

[22] PCT Filed: Feb. 22, 1992

[86] PCT No.: PCT/DE92/00134
§ 371 Date: Sep. 16, 1993
§ 102(e) Date: Sep. 16, 1993

[87] PCT Pub. No.: 92/17017
PCT Pub. Date: Oct. 1, 1992

[30] Foreign Application Priority Data

Mar. 16, 1991 [DE] Germany .................. 41 08 610.4

[51] Int. Cl.[6] ............................ H03K 19/0185
[52] U.S. Cl. .............................. 326/15; 326/86; 375/257
[58] Field of Search .............. 307/475, 443, 451, 446, 307/296.3; 361/18, 56, 111; 375/36; 326/15, 31, 83, 82, 86; 327/534

[56] References Cited

U.S. PATENT DOCUMENTS

| | | |
|---|---|---|
| 4,577,211 | 3/1986 | Bynum et al. .................. 257/546 |
| 4,620,310 | 10/1986 | Lvovsky et al. ................ 375/36 |
| 4,801,824 | 1/1989 | Fellinger et al. ............... 307/475 |
| 4,945,258 | 7/1990 | Picard et al. .................. 307/475 |
| 5,208,492 | 5/1993 | Masumoto et al. .............. 307/451 |

Primary Examiner—Edward P. Westin
Assistant Examiner—Jon Santamauro
Attorney, Agent, or Firm—Kenyon & Kenyon

[57] ABSTRACT

A transmitter end stage for a data transmission system comprising at least one control unit and data transmission lines, especially for a CAN bus system having at least one CAN controller and one CAN bus (CB) is proposed, characterized by the fact that the individual circuit elements of transmitter end stage 18 are integrated monolithically. As a result of the special layout and its circuit-design arrangement of the individual elements (3, 5; R1, D1, T1; R2, D2, T2; D10, D20) of the transmitter end stage, the effects of malfunctions, for example of short circuits of the data lines to ground or to the supply voltages, are reduced to a minimum. As a result of the special choice of pre-drivers (3, 5), minimum delay times are achieved, so that signals can be transmitted at a higher data rate.

15 Claims, 2 Drawing Sheets

TRANSMITTER END STAGE

BACKGROUND OF THE INVENTION

The present invention relates to a transmitter end stage for a data transmission system comprising at least one control unit and data transmission lines and in particular, for a CAN (Controller Area Network) bus system having at least one CAN controller and one CAN bus.

Transmitter end stages for data transmission systems, especially for controller-area-network bus systems (CAN bus systems) are known. Digital signals from a control unit of the data bus system, for example of a CAN controller, are output to the data bus with the aid of such transmitter end stages. The transmitter end stage must not be disturbed or even damaged by feedback from the data bus. For example, a short circuit of one or more of the data lines to ground or to the power supply can occur. In addition, electromagnetic noise signals can affect the data lines and hence the transmitter end stage. One disadvantage of known transmitter end stages is that they require relatively large amounts of space. As a result, applications for such transmitter end stages are limited. For example, when such transmitter end stages are used in the CAN bus systems of a motor vehicle, it is very important that the circuit be designed to be as small as possible. Moreover, when the known transmitter end stages are installed errors can occur that could adversely affect subsequent function of the entire system. In addition, the failure probability of the transmitter end stage is relatively high in view of the large number of individual components.

Therefore, a transmitter end stage which occupies a relatively small volume yet which has a relatively low rate of failure, enhanced interference protection and minimized feedback is needed.

SUMMARY OF THE INVENTION

The transmitter end stage according to the present invention advantageously occupies a very small space and is simple to install. Manufacturing of both the transmitter end stage and the entire system into which the transmitter end stage is integrated. As a result, manufacturing costs are sharply reduced. Moreover, the failure rates of the system can be reduced with the present transmitter end stage. The present transmitter end stage does so by mounting all the circuit elements of the transmitter end stage on a semiconductor substrate so that the entire circuit is monolithically integrated.

In a preferred embodiment of the transmitter end stage, each of the data lines of the bus system is assigned to a switching stage thereby optimizing protection from interference.

In a further preferred embodiment of the transmitter end stage, the components of the end stage circuit are preferably arranged in a series circuit thereby minimizing the feedback of the components to one another. During the diffusion of layers at various areas on the substrate to manufacture the individual components, parasitic components occur which adversely affect the function of the individual circuit elements. Such feedback and parasitic components are avoided or minimized in the present invention by the layout and the chosen circuit arrangement.

In a preferred embodiment of the transmitter end, separate pre-driver stages are assigned to the electronic switches of the end stage circuits thereby significantly reducing the signal delay of the circuit. As a result, digital signals can be transmitted at a high transmission rate.

In yet another embodiment of the transmitter end stage, resistors are provided directly to the terminals of the data lines. In this manner, the interaction of the data bus with the transmitter can be influenced by appropriately choosing the resistance values of the resistors.

In another preferred embodiment, the resistances are produced by a diffusion method and are formed lying in so-called "floating tubs." As a result of the design of the topography of the resistances, in the event of electromagnetic disturbances, or short circuits of the connecting terminals $CAN_H$ or $CAN_L$ to ground or the supply voltage, the current can be limited, thereby protecting the transmitter end stage and its components from damage and preventing a malfunction of the module. Moreover, the internal resistance of the end stage can be stabilized in this fashion so that the switching behavior of the transmitter end stage can be adjusted especially well to the CAN bus.

In a further preferred embodiment of the transmitter end stage, parasitic components resulting from the manufacture of the resistances, especially parasitic transistors of the floating tubs, are provided with a compensating circuit so that the effect of these parasitic components is eliminated. This measure permits optimal setting of the switching behavior of the transmitter end stage.

In an especially preferred embodiment of the transmitter end stage, the compensating circuit is designed as a diode.

Finally, in a preferred embodiment of the transmitter end stage, the end stage circuits, especially their diodes, are designed so that in the event of a short circuit of the corresponding data lines to ground or to the supply voltage and/or in the event of ground reversal, the current flowing through the components of the transmitter end stage is limited and a malfunction of the module is prevented. In this manner, interference or even damage to these components can be minimized.

BRIEF DESCRIPTION OF THE DRAWING

The present invention will now be described in greater detail with reference to the drawings.

DETAILED DESCRIPTION

While the transmitter end stage according to the present invention may be used for almost any data transmission device, it will be explained in the following with reference to a CAN bus system.

Figure 1:
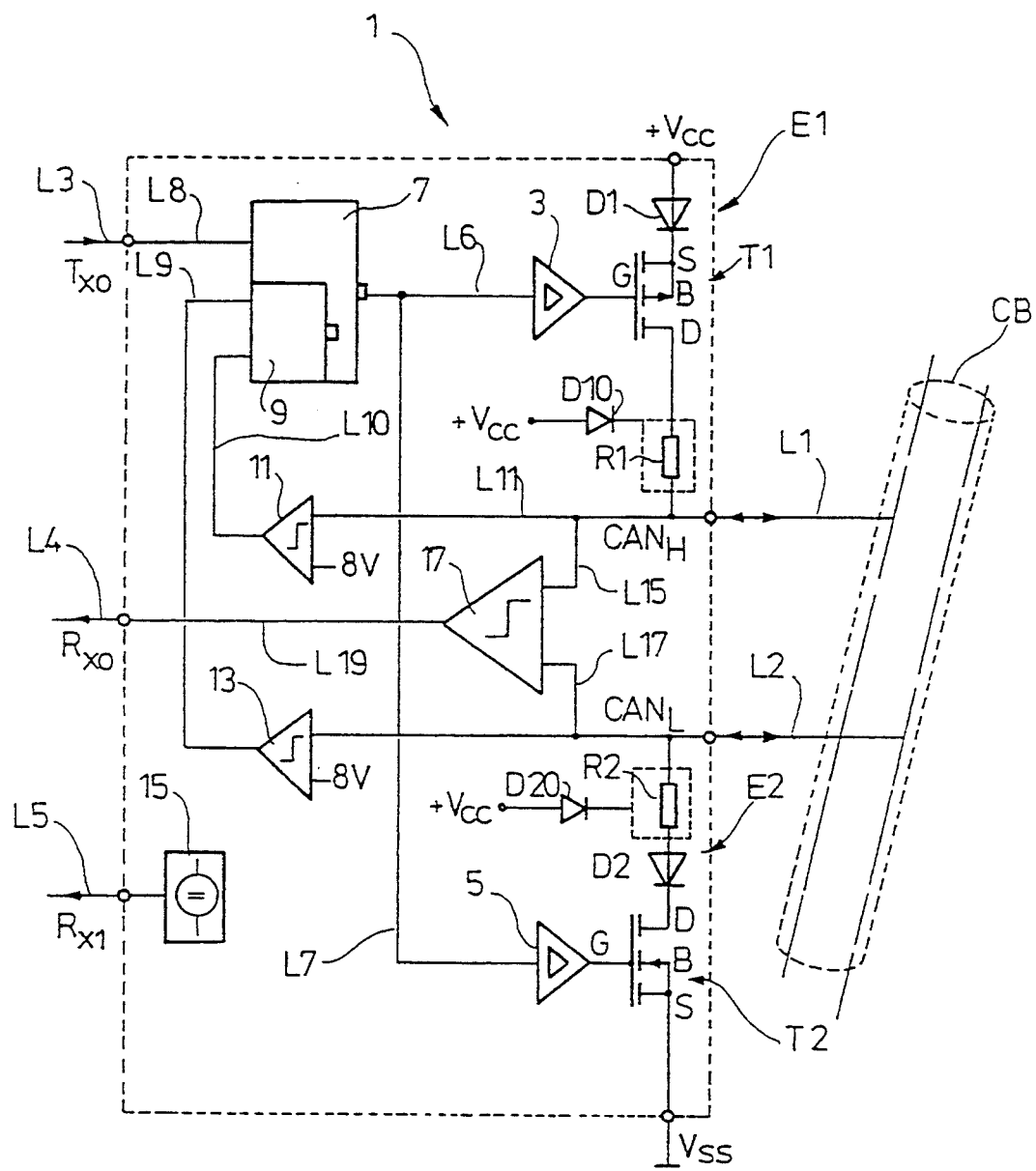
FIG. 1 is a block diagram of a CAN driver including a transmitter end stage and an indicated CAN bus.

FIG. 1 is a block diagram of a CAN driver 1, having a switching element which is surrounded by a dashed line. A CAN bus CB is coupled with CAN driver 1 through suitable lines L1 and L2 and is designed as a two-wire bus.

Signals are transmitted over lines L1 and L2 from the driver 1 to the bus CB and in the reverse direction from the transmitter end stage to the bus. The lines L1 and L2 are coupled with two connections $CAN_H$ and $CAN_L$, respectively, of the CAN driver.

As shown in FIG. 1 CAN driver 1 includes additional terminals such as a terminal $+V_{CC}$ to which a positive supply voltage can be connected, as well as a terminal $V_{SS}$ which can be grounded, for example.

Signals from a control circuit or a CAN controller, not shown here, are conducted through a line L3 to a terminal marked $T_{x0}$.

Signals applied to a terminal $R_{x0}$ are further conducted over a line L4 and the signals applied to a terminal $R_{x1}$ are conducted over a line L5 to the CAN controller, not shown here.

A first end stage circuit E1 of the transmitter end stage is coupled with terminal $+V_{CC}$, the circuit being associated with terminal $CAN_H$. The first end stage circuit E1 comprises a first diode $D_1$ whose anode is coupled with terminal $+V_{CC}$. The diode $D_1$ is connected in an electrically conducting manner with an MOS transistor T1, shown here for example as an enhancement-type MOSFET such that the cathode of $D_1$ is coupled with source lead S and with bulk lead B of transistor T1. The drain lead D of the transistor T1 is coupled with terminal $CAN_H$ via resistor R1. Transistor T1 shown here is designed as a p-channel FET. The gate lead G of transistor T1 is coupled with the output of a driver circuit 3, the details of which are omitted here.

A second end stage circuit E2 of the transmitter end stage is arranged between terminal $CAN_L$ and terminal $V_{SS}$. Here a resistor R2 is arranged between terminal $CAN_L$ and the anode of a diode $D_2$. The cathode of diode $D_2$ is connected to the drain lead D of a second transistor T2, likewise designed as an enhancement-type MOSFET. The bulk lead B and source lead S of the second transistor T2 are connected together and are coupled with terminal $V_{SS}$. Gate lead G of the second transistor T2 is coupled with the output of a driver circuit 5, the details of which are omitted here. The two driver circuits 3 and 5 of end stage circuits E1 and E2, respectively, are controlled through lines L6 and L7, respectively, by a cutoff logic circuit 7. The cutoff logic circuit 7 protects end stage transistors T1 and T2 against damage in the event of a short circuit or polarity reversal. Since the cutoff logic circuit 7 is of a known type, the details of its structure and function will not be described here.

The signals of the CAN controller are supplied through line L3 and terminal $T_{x0}$ to input lead L8 of cutoff logic circuit 7. The cutoff logic circuit also includes an AND circuit 9 having inputs L9 and L10 which are connected by comparator circuits 11 and 13 with terminals $CAN_H$ and $CAN_L$, respectively. The signals from the CAN bus CB which are applied to terminal $CAN_H$ are fed through a line L11 to a first input of a comparator 11 while a fixed reference voltage of 8 V for example is applied to a second input of comparator 11.

Signals applied to terminal $CAN_L$ from CAN bus CB are fed to a first input of a comparator 13 via line L13 while a reference voltage of 8 V for example is applied to a second input of comparator 13.

CAN driver 1 also comprises a voltage divider 15, through which an external reference voltage is applied to terminal $R_{x1}$ for further switching of the driver module.

CAN driver 1 has a receiving comparator 17 having a first input coupled with terminal $CAN_H$ via line L15 and a second input coupled with terminal $CAN_L$ via line L17. Hence, the signals entering from the CAN bus CB are applied to the input side of receiving comparator 17.

The output of receiving comparator 17 is coupled with terminal $R_{x0}$ via line L19. The signals applied to this terminal are conducted through line L4 to the CAN controller.

FIG. 1 also illustrates a section of a CAN bus system in which CAN bus CB is designed as a two-wire bus, as used for example in motor vehicles. The signals present on the CAN bus are fed through lines L1 and L2 to terminals $CAN_H$ and $CAN_L$, respectively, of CAN driver 1, processed by receiving comparator 17, and conducted via terminal $R_{x0}$ over line L4 to the CAN controller. Conversely, signals from the CAN controller can be applied through terminal $T_{x0}$ and through cutoff logic 7 to the end stage circuits E1 and E2 of the transmitter end stage, and thus reach terminals $CAN_H$ and $CAN_L$. Such signals provided by the CAN controller can then be delivered to the CAN bus over lines L1 and L2.

Figure 2:
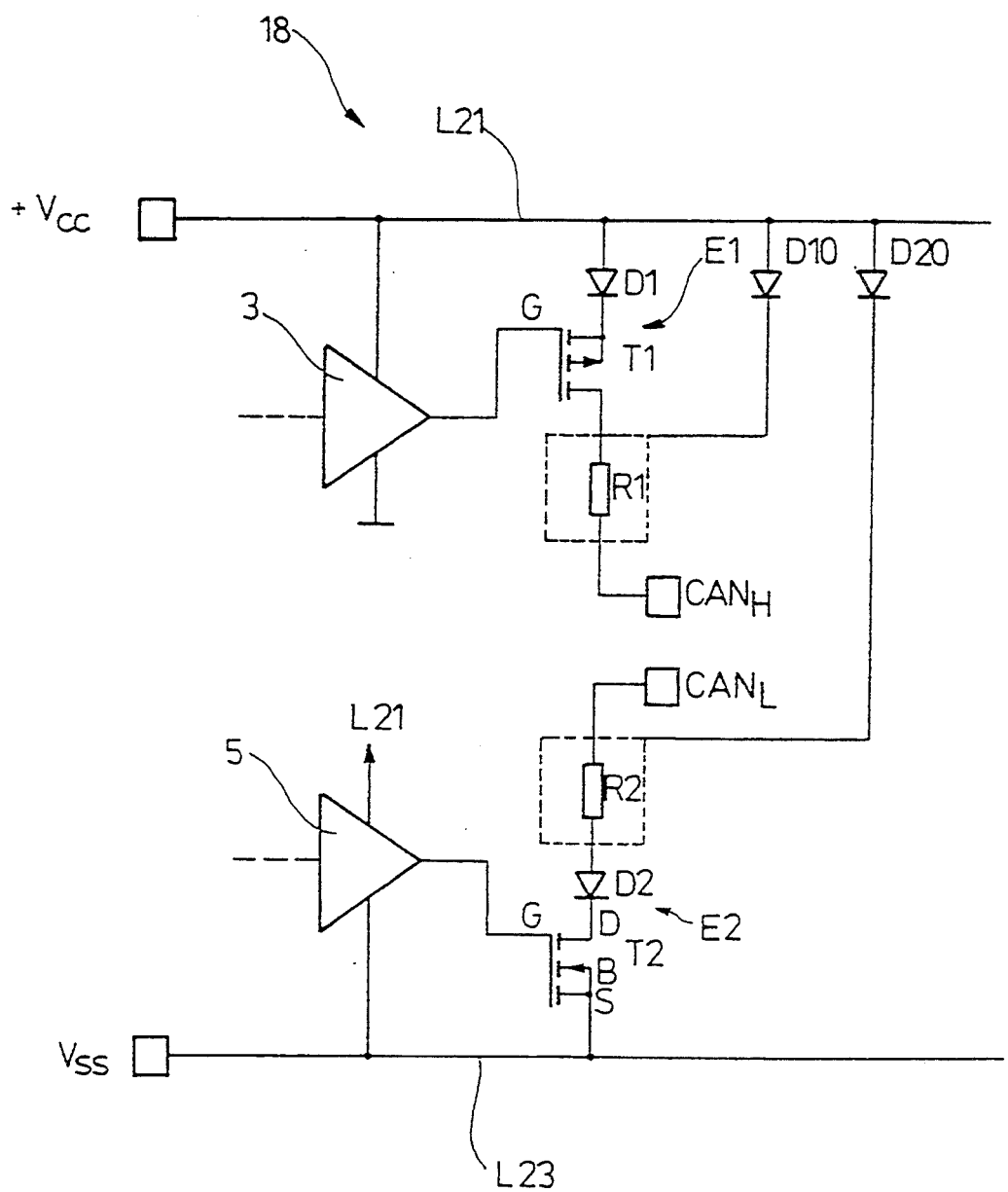
FIG. 2 is a schematic diagram of the separate transmitter end stage.

For clarity, in FIG. 2 the transmitter end stage 18 is shown again separately, while in FIGS. 1 and 2 corresponding elements have been given the same reference numerals.

A line L21 is connected to terminal $+V_{CC}$, while a line L23 is connected to terminal $V_{SS}$. The first pre-driver 3 assigned to the first switching stage E1 is coupled with line L21, in other words with the power supply $+V_{CC}$, and to line L23, grounded here. The output of pre-driver 3 is provided to gate lead G of the first transistor T1, which, as explained above, is designed as a MOSFET.

Resistor R1 of the first end stage circuit E1 is designed here to lie in a floating tub, indicated by a dashed rectangle. In addition, a p-diffused area is located in an n-epitaxy. In this way, a parasitic transistor is created as a parasitic component through the interplay of the tub with the remaining substrate. As a result, the entire function of transmitter end stage 18 is adversely affected. Therefore, a compensating circuit is provided here designed as diode D10. The parasitic transistor is eliminated since the floating tub of resistor R1 is connected through diode D10 to power supply $+V_{CC}$. This means that a diode D10 is associated with resistor R1 and has a cathode connected to the tub of the resistor and an anode connected to lead L21, in other words to power supply $+V_{CC}$.

The second switching stage E2 is designed similarly. However it must be kept in mind that the arrangement of the components connected in series, diode D2, electronic switch T2 and resistor R2, have been altered relative to the first switching stage E1, since the parasitic elements of diode D1 would otherwise permit such a small common-mode area. Transistor T2 of the second switching stage E2, designed as a MOSFET, is connected directly to line L23, in other words to ground. The cathode of diode D2 is connected to the drain lead D of the transistor T2. The anode of diode D2 is coupled with terminal $CAN_L$ associated with the second wire of data bus CB via resistor R2.

Resistor R2 is also designed lying in a floating tub and is made by the formation of a p-diffusing area within a n-epitaxy, whereby once again a parasitic component, namely a transistor, is created by the interaction with the substrate. The effect of this parasitic transistor is again eliminated by the compensating circuit designed as a diode, namely, by diode D20. The cathode of diode D20 is connected to the tub of resistance R2, while its anode is connected to lead L21, i.e., to supply voltage $+V_{CC}$.

The pre-driver 5 associated with this switching stage E2 is connected to the gate lead G of transistor T2, said pre-driver in turn being connected to lead L21, i.e., to voltage supply $+V_{CC}$, and to ground, i.e., lead L23.

The signals conducted through pre-drivers 3 and 5, which are finally supplied by the CAN controller are indicated by a dashed line on the input side of the pre-driver.

The transmitter end stage 18, more clearly shown in FIG. 2, is designed especially for the operation of a data transmission system or a CAN bus system in a motor vehicle, where noise signals are especially numerous. The transmitter end stage is endangered especially by noise signals resulting from short-circuiting of the data bus lines to ground or to the supply voltage and from ground reversal, because of the low-impedance coupling to the CAN bus CB. The individual components of switching stages E1 and E2 are designed and arranged such that, in the event of such noise signals, or noise signals caused by electromagnetic factors, damage to the transmitter end stage and malfunction of the component are avoided.

For example resistors R1 and R2 limit the current through the switching stages at noise peaks generated by electromagnetic signals or short circuits. At the same time the internal resistance of the transmitter end stage is stabilized, so that its "reflection-poor" connection to the self-contained bus system remains assured.

Diodes D1 and D2 are arranged within the switching stages and are manufactured during the production of the transmitter end stages such that, in the event of a short circuit of the bus lines to the supply voltage or ground (i.e., in the event of a short circuit of terminals $CAN_H$ and $CAN_L$ to $+V_{CC}$ or $V_{SS}$), the transmitter end stages are protected and full function is maintained. At the same time, ground reversal will not cause any damage to the structural elements of the circuit or malfunction of the component.

A minimum delay time for transmitter end stage 18 is guaranteed by pre-drivers 3 and 5, arranged between the output of the CAN controller and the end stage transistors T1 and T2, respectively. As a result, transmission signals may be transmitted at a high data rate with minimum distortion.

The monolithically integrated transmitter end stage can be made very small and integrated into a CAN driver. As a result, the installation and/or assembly of such a transmitter end stage or of the corresponding driver in a control circuit receiving these components in a motor vehicle is very simple and economical. Moreover the failure probability of assemblies installed in this way is particularly low, since even at high mechanical loads for example, the electrical connection between the individual circuit elements remains assured. In contrast to discretely constructed circuits, the leads here can be lead wires, for example, which practically never break as a result of vibration.

We claim:

1. In a driver associated with a data line of a bus system, a monolithically integrated end-stage circuit comprising:
    a) a switching transistor, said switching transistor
       i) electrically coupled between said data line and a supply voltage,
       ii) controlled by a control signal;
    b) a resistor, said resistor
       i) connected in series with said switching transistor,
       ii) connected to said data line,
       iii) formed lying in a tub of said monolithically integrated circuit;
    c) a first diode, said first diode
       i) including an anode coupled with said supply voltage,
       ii) including a cathode coupled with said tub of said resistor; and
    d) a second diode, said second diode connected in series with said switching transistor.

2. The circuit of claim 1 wherein said switching transistor is a field-effect transistor having a gate, a drain, and a source.

3. The circuit of claim 2 wherein said second diode includes an anode coupled with said supply voltage and a cathode coupled with said source of said switching transistor and wherein said drain of said switching transistor is coupled with said data line via said resistor.

4. The circuit of claim 3 wherein said switching transistor is a p-channel, enhancement-type MOSFET.

5. The circuit of claim 2 further comprising a second switching transistor having a source which is connected to ground, a third diode including a cathode coupled with a drain of said second switching transistor, and said third diode including an anode coupled with a second data line via a second resistor.

6. The circuit of claim 1 wherein said switching transistor is an n-channel, enhancement-type MOSFET.

7. The circuit of claim 2 further comprising
    e) a driver circuit, said driver circuit coupled with, and providing control signals to, said gate of said switching transistor.

8. The circuit of claim 1 wherein said resistor stabilizes an internal resistance of said end stage circuit.

9. The circuit of claim 1 wherein said resistor limits current flowing through said circuit in the event of malfunctions.

10. The circuit of claim 1 wherein said resistor limits current flowing through said circuit in the event of electro-magnetic malfunctions.

11. The circuit of claim 1 wherein said second diode limits current flowing through said circuit in the event of a shorting of said line to ground.

12. The circuit of claim 1 wherein said second diode limits current flowing through said circuit in the event of a shorting of said line to said supply voltage.

13. The circuit of claim 1 wherein said second diode limits current flowing through said circuit in the event of a ground reversal.

14. In a Controller Area Network driver adapted to control a bus, being coupled with a controller, and being provided with a voltage supply, a monolithically integrated end-stage circuit comprising:
    a) a transistor having a gate, a drain, and a source;
    b) a data line coupling said bus with said end-stage circuit;
    c) a resistor, said resistor
       i) electrically coupled between said data line and said drain of said transistor, and
       ii) formed lying in a tub of said monolithically integrated end-stage circuit;
    d) a compensating circuit electrically coupled between said tub of said resistor and said voltage supply;
    e) a diode electrically coupled between said voltage supply and said source of said transistor; and
    f) a predriver, said predriver
       i) having an input based on a signal from said controller, and
       ii) having an output coupled with said gate of said transistor.

15. The circuit of claim 14 wherein said compensating circuit is a diode.

* * * * *

UNITED STATES PATENT AND TRADEMARK OFFICE
CERTIFICATE OF CORRECTION

PATENT No. : 5,448,180

DATED : September 5, 1995

INVENTOR(S): Kienzler et al.

It is certified that error appears in the above-identified patent and that said Letters Patent is hereby corrected as shown below:

Column 3, line 7, "LA" should be --L4--.

Column 4, ine 11, "LA" should be --L4--.

Column 4, line 33 "In addition" should be --Therefore,--

Column 6, line 23, "claim 1" should be --claim 5--.

Signed and Sealed this

Sixteenth Day of July, 1996

Attest:

BRUCE LEHMAN

*Attesting Officer*   *Commissioner of Patents and Trademarks*